April 14, 1959     K. HILS ET AL     2,882,427
BICYCLE HUB DYNAMO

Filed Sept. 17, 1956     2 Sheets-Sheet 1

INVENTORS:
KARL HILS
HANS JOACHIM SCHWERDHÖFER

By Richardson, David and Nerdon

Atty's

April 14, 1959     K. HILS ET AL     2,882,427
BICYCLE HUB DYNAMO

Filed Sept. 17, 1956     2 Sheets-Sheet 2

INVENTORS:
KARL HILS
HANS JOACHIM SCHWERDHÖFER

By Richardson, David and Nardon
ATTY S.

United States Patent Office 2,882,427
Patented Apr. 14, 1959

2,882,427
BICYCLE HUB DYNAMO

Karl Hils and Hans Joachim Schwerdhofer, Schweinfurt am Main, Germany, assignors to The Firma Fichtel & Sachs A.G., Schweinfurt am Main, Bavaria, Germany Application September 17, 1956, Serial No. 610,315

Claims priority, application Germany January 17, 1956

7 Claims. (Cl. 310—67)

The present invention relates to a novel generator or dynamo powered by the hub of a device such as a bicycle. More particularly, it relates to novel means for powering a lighting dynamo of a device such as a bicycle through a rotating hub thereof.

To provide electric current for lighting signal lamps on bicycles, the bicycle hub has been provided with a dynamo powered by the act of pedalling. To bring the light intensity up to the desired level at normal speeds it has proven necessary to include in the dynamo a large number of poles. If it is attempted to obtain the same light intensity by means of a friction roller cooperating with the tire, the number of poles required in the dynamo would be approximately 264. This would obviously require a hub and dynamo of large dimensions and weight. This is evidenced by the fact that existing devices of this kind are provided with only about 20 poles. Moreover, such devices cannot be disconnected when driving in daylight so that they are power-consuming even when their use is not necessary.

Bicycle hubs have been contemplated having built-in dynamos with few poles, transmission of power between the hub and the rotatable element of the dynamo being effected by a single stage or multi-stage spur or planet driving arrangement, either in a form engaging manner through gear teeth or in a force engaging manner through frictional contact. Transmission ratios 30:1 to 35:1 are necessary with such arrangements to achieve the same light intensity as with other dynamo systems but these ratios have not been attained and the intensity of light has accordingly been less than desired. In addition, the systems were expensive due to the many wheels and bearings, the large diameters of the parts, and the interrupted and complicated axle.

Still other systems which have been contemplated have various driving stages disposed adjacent each other, and operate through multi-stage frictional driving or through toothed gear driving. While the diameter of the hub casing can be reduced in this manner, the technical expenditure is large. Frictional gears or driving arrangements of this type are very sensitive to adjustment because a certain axial pressure is required for preventing slipping during operation. Actual specimens of this type provide transmission ratios of up to 15:1.

It has also been proposed to drive several dynamos through a single driving system so as to attain the desired intensity of light.

All of the embodiments described hereinabove yield a light output within certain limits. With the hub having the highest transmission ratio of about 15:1 the efficiency is very poor due to the many engaged gears or pairs of friction wheels. A further disadvantage of such a driving arrangement resides in the loud noise which is caused by the many pairs of wheels with very low degrees of overlapping.

It is an object of the present invention to provide a dynamo driving arrangement with high transmission ratios.

It is a further object of the invention to provide a driving arrangement for a dynamo which can be housed within a bicycle hub without necessitating increase in the size of the hub.

Still another object of the invention is to provide a dynamo driving arrangement which is inexpensive to manufacture and which transmits power at such high efficiency that dynamos with few poles can be used to produce light of a sufficiently high intensity for bicycle illuminating purposes.

These and other objects and advantages are realized in accordance with the present invention wherein there is provided a hypocyclic driving arrangement comprising an annular member, an inner member rolling along the inner surface of said annular member, the diameter of the pitch circle of the inner member being only slightly smaller than the diameter of the pitch circle of the annular member, an eccentric bearing and a balancing or equalizing clutch. The efficiency is very high because only a single pair of members is engaged. As a result, transmission ratios up to 50:1 may be attained with no greater expenditure for materials than would be required to attain a transmission ratio of 10:1.

The high transmission ratios permit use of dynamos with few poles and the same light intensity will result as with conventional dynamos employing friction rollers which require a far greater number of poles. Moreover, where the engagement between the annular and inner members is effected through gear teeth the overlap is quite great so that quiet operation is achieved.

An embodiment of the invention will now be described with reference to the accompanying drawing, wherein.

Figure 1:
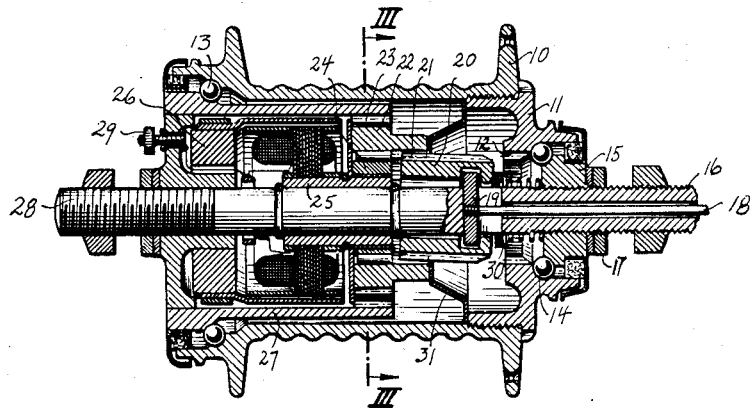
Fig. 1 is a longitudinal section through a hub provided with a dynamo, and shown in disengaged state.

Referring now more particularly to the drawing, there is shown a hub casing 10 which is rotated in conventional manner by pedalling of the bicycle (not shown), the casing being screwed to an annular portion 11 which is provided with internal gear teeth 12. Casing 10 and portion 11 rotate together in substantially frictionless manner due to ball bearings 13, 14.

Ball bearings 14 rest between the portion 11 and a member 15 which is internally threaded to receive an externally threaded tube 16 held to member 15 by nuts 17. A shaft 18 extends through tube 16 into the interior of the casing 10 and at its end is connected with a slidable block 19 which seats in a groove of a clutch member 20, the latter serving as an equalizing clutch. The clutch member 20 is externally toothed and engages the internally toothed portion 21 of annular rolling wheel 22 which is also provided with an externally toothed portion 23.

An eccentric 24 is disposed within the annulus of wheel 22 and is connected with the armature 25 of a dynamo which also includes magnet 26. A stationary annular member 27 is disposed within casing 10 and provides support for the hub axle 28 about which armature 25 can rotate. Member 27 is provided with a post 29 for connection of electric wires from the dynamo to the electric bulb (not shown), and at its innermost end is internally toothed opposite rolling wheel 22. The pitch diameter of the gear teeth of wheel 22 is almost but not quite equal to that of the gear teeth of member 27.

The structure of Fig. 1 is completed by a coiled spring 30 which acts against clutch member 20 and urges it to the left so that it is out of engagement with portion 11. A dished element 31 is disposed inside the casing 10 to prevent canting of the wheel 22 when the latter rotates.

During the day when the bicycle is being pedalled the parts are in the position shown in Fig. 1. The hub casing 10 rotates together with portion 11 and all other elements remain stationary. When it gets dark and it is desired to operate the dynamo for generating electric current and thereby illuminating the light on the bicycle (not shown), shaft 18 is displaced to the right against the action of spring 30. For convenience, the free end of shaft 18 can be connected by a chain or rods to an operating lever adjacent or on the steering wheel of the bicycle (not shown).

Figure 2:
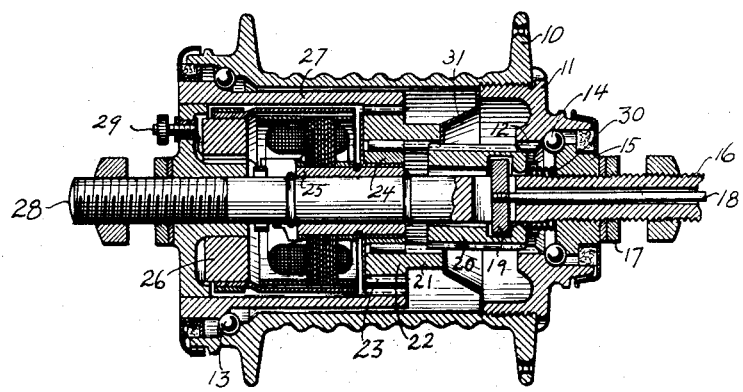
Fig. 2 is a view similar to Fig. 1 showing the dynamo engaged with the hub.
Figure 3:
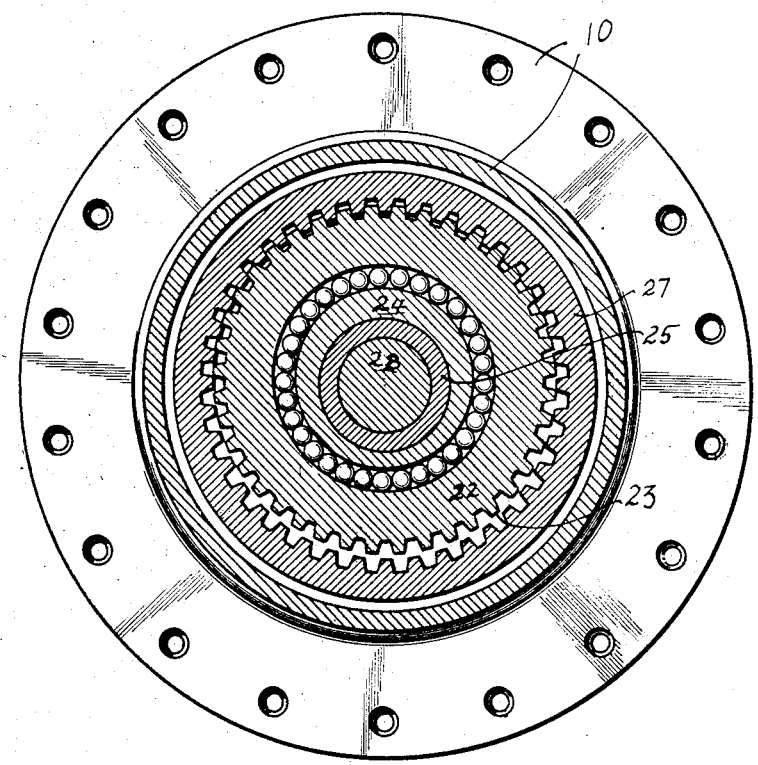
Fig. 3 is a section taken along line III—III of Fig. 1, and shown on an enlarged scale.

Slidable block 19 is carried to the right together with shaft 18 and pulls clutch member 20 therewith so that the external teeth at the right engage with the teeth 12 of portion 11. The elements are then in the positions shown in Fig. 2.

Rotation of portion 11 is thus transmitted through member 20 to wheel 22 by means of teeth 21. The eccentric mounting of wheel 22 causes the teeth 23 to engage with the teeth of member 27 which results in rotation of eccentric 24 in opposite direction to hub casing 10 at a greatly increased rate. Armature 25 is rotated together with eccentric 24 and as a result the dynamo is powered to generate the desired electric current. When illumination is no longer required, displacement of shaft 18 to the left disengages clutch member 20 and terminates rotation of the armature.

Since in a dynamo either the wire bearing element or the magnet can be rotated to induce the electric current, it is apparent that elements 25 and 26 can be transposed so that the magnet will be rotated.

While the engaging portions of the hypocyclic drive, viz., portion 23 of wheel 22 and member 27 have been shown as gear teeth so that there is a form or profile engagement, it is apparent that force or frictional engagement would be equally effective for the hypocyclic drive and would produce the same transmission ratio so long as the effective diameters of the engaging members remain unchanged.

Fabrication of the elements wherever possible from materials such as light weight alloys or preferably plastics will serve to reduce the overall weight of the hub, will ensure quiet running of the gearing and dynamo and increase the electromagnetic field strength. At the same time the construction is simplified and less space is required so that conventional small hub casings can be utilized. Because of the high transmission ratios attainable, a dynamo with a minimum number of poles can be utilized and the light intensity will nonetheless be at least equal to that achieved with the conventional dynamo driving arrangements heretofore employed such as those utilizing tire friction rollers.

Various changes and modifications may be made without departing from the spirit and scope of the present invention and it is intended that such obvious changes and modifications be embraced by the annexed claims.

What is claimed is:

1. In combination, a rotatable bicycle hub casing, a dynamo housed within said casing, said dynamo including a rotatable element, a hypocyclic drive operatively connecting said hub casing with said rotatable element of said dynamo, and clutch means coaxially related to said casing for interengaging said casing and said hypocyclic drive, said hypocyclic drive including a stationary outer annular member and a rotatable inner member running along the inner periphery of said outer member, the effective diameter of the inner periphery of said outer member being slightly greater than the effective diameter of the outer periphery of said inner member, and an eccentric operatively connecting said inner member with said rotatable element of said dynamo, whereby rotation of said inner member produces rotation of said eccentric and said rotatable element of said dynamo, whereby upon rotation of said hub casing, rotation is imparted to said rotatable element for powering said dynamo.

2. In combination, a rotatable bicycle hub casing, a dynamo housed within said casing and including a rotatable element, a stationary axle extending into said hub casing and supporting said rotatable element of said dynamo, a stationary outer annular member within said casing and also supported by said axle, an annular inner member within the annulus of said outer member, the effective outer diameter of said inner member being slightly smaller than the effective inner diameter of said outer member, an eccentric received within the annulus of said inner member and connected with said rotatable element of said dynamo so as to cause engagement between a portion of said inner member and said outer member, and axially displaceable clutch means operatively connecting said hub casing with said inner member, whereby rotation of said hub casing is transmitted successively to said clutch means, said inner member, said eccentric and said rotatable element for powering said dynamo.

3. The combination defined in claim 2, wherein said hub casing is provided with an internally toothed portion and said inner member is also provided with an internally toothed portion, said clutch means including an externally toothed portion which upon displacement engages both said internally toothed portions so as to establish a driving connection therebetween.

4. The combination defined in claim 3, including a spring normally urging said externally toothed portion of said clutch means out of engagement with one of said internally toothed portions so as not to power said dynamo, a slidable block operatively connected with said externally toothed portion of said clutch means, and a rod operatively connected with said block and extending outside of said casing, whereby upon displacing said rod against the action of said spring means said block displaces said externally toothed portion into a position wherein it engages both internally toothed portions for powering said dynamo.

5. The combination defined in claim 2, including a dished element housed within said casing and disposed adjacent said inner member to prevent canting of the latter.

6. The combination defined in claim 2, wherein the inner periphery of said outer member and the outer periphery of said inner member have meshing gear portions.

7. The combination defined in claim 2, wherein said inner member and said outer member comprise engageable frictional contact means.

References Cited in the file of this patent

UNITED STATES PATENTS

| | | |
|---|---|---|
| 1,158,456 | Dey | Nov. 2, 1915 |
| 2,061,245 | Nowosielski | Nov. 17, 1936 |
| 2,099,972 | Dalen | Nov. 23, 1937 |

FOREIGN PATENTS

| | | |
|---|---|---|
| 502,285 | Great Britain | Mar. 15, 1939 |
| 624,308 | Germany | Jan. 17, 1936 |
| 635,331 | Germany | Sept. 19, 1936 |